(12) United States Patent
Ganapathiappan et al.

(10) Patent No.: US 8,685,154 B2
(45) Date of Patent: *Apr. 1, 2014

(54) INKS WITH WATER SOLUBLE NEAR IR DYES

(75) Inventors: Sivapackia Ganapathiappan, Los Altos, CA (US); Zhang-Lin Zhou, Palo Alto, CA (US); Jayprakash C. Bhatt, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 256 days.

This patent is subject to a terminal disclaimer.

(21) Appl. No.: 13/058,475

(22) PCT Filed: Aug. 12, 2008

(86) PCT No.: PCT/US2008/072899
§ 371 (c)(1),
(2), (4) Date: Feb. 10, 2011

(87) PCT Pub. No.: WO2010/019138
PCT Pub. Date: Feb. 18, 2010

(65) Prior Publication Data
US 2011/0135815 A1  Jun. 9, 2011

(51) Int. Cl.
*C09D 11/02* (2006.01)

(52) U.S. Cl.
USPC .................................. 106/31.49

(58) Field of Classification Search
CPC .................................. C09D 11/328
USPC ............ 106/31.49, 31.78; 540/128, 129, 132, 540/133, 140; 427/160
See application file for complete search history.

(56) References Cited

U.S. PATENT DOCUMENTS

| | | | |
|---|---|---|---|
| 4,622,179 A * | 11/1986 | Eda | 540/139 |
| 4,695,411 A | 9/1987 | Stern | |
| 5,282,894 A | 2/1994 | Albert et al. | |
| 5,614,008 A * | 3/1997 | Escano et al. | 106/31.49 |
| 6,239,298 B1 | 5/2001 | Williamson | |
| 6,642,399 B2 | 11/2003 | Boocock | |
| 7,148,345 B2 * | 12/2006 | Vonwiller et al. | 540/145 |
| 7,223,453 B2 | 5/2007 | Takashima | |
| 7,279,034 B2 | 10/2007 | Oki | |
| 7,300,503 B2 | 11/2007 | Tateishi | |
| 7,417,141 B2 * | 8/2008 | Vonwiller et al. | 540/145 |
| 7,658,792 B2 * | 2/2010 | Indusegaram et al. | 106/31.49 |
| 8,206,496 B2 * | 6/2012 | Ganapathiappan et al. | 106/31.49 |
| 8,226,757 B2 * | 7/2012 | Ganapathiappan et al. | 106/31.49 |
| 2006/0201387 A1 * | 9/2006 | Patel | 106/31.49 |
| 2007/0044680 A1 * | 3/2007 | Vonwiller et al. | 540/128 |
| 2007/0266891 A1 * | 11/2007 | Vonwiller et al. | 106/31.49 |
| 2008/0006177 A1 * | 1/2008 | Indusegaram et al. | 106/31.46 |
| 2012/0092428 A1 * | 4/2012 | Ganapathiappan et al. | 347/102 |
| 2012/0139994 A1 * | 6/2012 | Ganapathiappan et al. | 106/31.49 |

FOREIGN PATENT DOCUMENTS

| EP | 0134518 | 3/1985 |
|---|---|---|
| JP | 5005907 | 1/1993 |

* cited by examiner

*Primary Examiner* — Helene Klemanski

(57) ABSTRACT

The methods and compositions of the present invention provide an ink jet ink having a colorant, an aqueous vehicle, and water stable and water soluble phthalocyanine and/or naphthalocyanine dye chromophores.

16 Claims, No Drawings

INKS WITH WATER SOLUBLE NEAR IR DYES

BACKGROUND OF THE INVENTION

In certain inks, colorants that reflect light outside of the visible spectrum can be useful for some applications. For example, dyes that exhibit absorption in the near-infrared range 700 to 1000 nm can be useful in a variety of fields, including security printing, print authentication, counterfeit assessment, RFID tags, etc. Many of technologies utilizing near IR materials require that these materials be dissolved in organic solvents, water, and/or aqueous or organic solvent blends. Some applications, such as thermal ink-jet printing, require that the near infrared absorbing material be kept in aqueous solution for long periods of time. Near IR dyes should also be stable in aqueous solvent blends for a long time without undergoing any kind of chemical change. Any degradation or changes to its physical/chemical nature can destroy the conjugation and thus lose the near-IR absorption. Such changes can adversely affect the desired property (absorption in the near IR wavelength range) and can destroy the purpose for which the material was added. For example, near IR dyes of the cyanine dye class are soluble in water but are chemically unstable in aqueous solutions over long time at wide pH ranges, and are therefore not suitable for many ink-jet applications. Thus, there is need for chemically stable and water soluble near IR absorbing dyes.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

As used herein, "vehicle" or "liquid vehicle" is defined to include liquid compositions that can be used to carry colorants to a substrate. Liquid vehicles are well known in the art, and a wide variety of ink vehicles may be used in accordance with embodiments of the present invention. Such ink vehicles may include a mixture of a variety of different agents, including without limitation, surfactants, organic solvents and co-solvents, buffers, biocides, viscosity modifiers, sequestering agents, stabilizing agents, anti-kogation agents, and water. Though not part of the liquid vehicle per se, in addition to the colorants, the liquid vehicle can carry solid additives such as polymers, latexes, UV curable materials, plasticizers, salts, etc. As such, the term "aqueous liquid vehicle" or "aqueous vehicle" refers to a liquid vehicle having water as a major solvent, and often, a predominant solvent.

The term "near infrared" or near IR" refers to optical radiation in the range of about 700 nm to 1400 nm. In accordance with embodiments of the present invention, the near IR dyes of the present disclosure can absorb optical radiation within the near IR spectrum, and in one embodiment, in the 700 nm to 1000 nm range.

As used herein, "colorant" can include dyes, pigments, and/or other particulates that may be suspended or dissolved in an ink vehicle prepared in accordance with embodiments of the present invention. Dyes are typically water soluble, and therefore, can be desirable for use in many embodiments. However, pigments can also be used in other embodiments. Pigments that can be used include self-dispersed pigments and polymer dispersed pigments. Self-dispersed pigments include those that have been chemically surface modified with a charge or a polymeric grouping. This chemical modification aids the pigment in becoming and/or substantially remaining dispersed in a liquid vehicle. The pigment can also be a polymer-dispersed pigment that utilizes a dispersant (which can be a polymer, an oligomer, or a surfactant, for example) in the liquid vehicle and/or in the pigment that utilizes a physical coating to aid the pigment in becoming and/or substantially remaining dispersed in a liquid vehicle. It is noted that the term "colorant" does not include the near IR dyes described in accordance with embodiments of the present disclosure, e.g., near IR dyes generally described in Formulas 1 and 4.

The term "about" when referring to a numerical value or range is intended to encompass the values resulting from experimental error that can occur when taking measurements.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical values, such as ratios, concentrations, amounts, molecular sizes, etc., may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

With this in mind, the present invention is drawn to the area of ink-jet imaging. More specifically, the present invention is drawn to ink-jet inks having near-infrared absorbing compounds. Generally, phthalocyanine and naphthalocyanine, uncomplexed as well as metal complexed, are chemically stable but are difficult to solubilize in water. Traditionally, these compounds are made in a multi-step synthetic process involving highly ionic groups or water soluble ethylene oxide groups which are attached, allowing for dissolution of these compounds in water. However, these compounds are either difficult to make or become less stable in water, especially in aqueous ink formulations. As such, this disclosure describes the design and synthesis of unique, water stable and water soluble phthalocyanine and naphthalocyanine dye chromophores.

It is noted that when discussing details related to the ink jet inks or methods of printing such inks herein, these details can be considered applicable to each of these embodiments, whether or not they are explicitly discussed in the context of that embodiment. Thus, for example, in discussing a water soluble group of a near-infrared absorbing compound, the water soluble group can be used in any of the near-infrared absorbing compounds described herein as well as methods of printing inks containing such compounds, and vice versa.

As such, an ink-jet ink can comprise an aqueous vehicle and a near-infrared absorbing compound having the following structure, as illustrated in Formula 1:

Formula 1

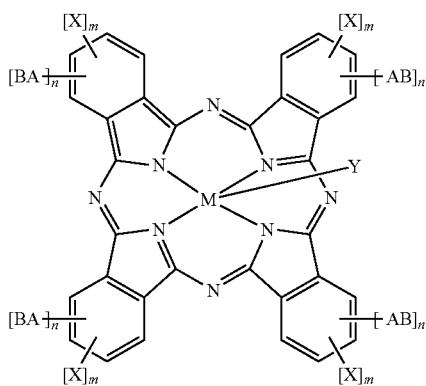

where M is a metal; Y is halogen, OH, $OSO_3M'$, or OCOR where M' is a cationic counterion or hydrogen and R is hydrogen, an alkyl group or an aryl group, including linear or branched alkyl or substituted or unsubstituted alkyl or aryl; X is a water soluble group; m is 0 to 4 with the proviso that the near-infrared absorbing compound has at least one water soluble compound; A is a divalent linking group; B is a monovalent group; and n is 0 to 4. In one embodiment, the ink jet ink can further comprise a colorant.

As a general matter, it is noted that when referring to variables in the structure of Formula 1 above, or any other formula herein, each constituent is considered to be independent from one another. For example, each m should be considered to be independently from 0 to 4. Thus, for example, one of the m constituents shown may be 0, another m may be 3, and the two remaining m constituents may be 2. In other words, if m is 3 for one constituent, it does not necessarily mean that it is 3 for the other m constituents. This is likewise true for n, B, A, X, etc. As a further example, each X constituent does not need to be the same water soluble group.

This being said, the metal can be any metal or semi-metal. In one embodiment, the metal can be selected from the group consisting of indium, gallium, thallium, germanium, tin (II and IV), antimony, bismuth, zinc, cobalt, nickel, silicon, titanium, vanadium, chromium, manganese, yttrium, scandium, zirconium, niobium, molybdenum, ruthenium, rhodium, hafnium, tantalum, bismuth, and mixtures thereof. In another embodiment, the metal can be indium. In still another embodiment, the metal can be gallium or thallium.

The water soluble group can be any substituent that is hydrophilic or water soluble. As such, the water soluble group can be selected from the group consisting of $COOM'$, $SO_3M'$, $PO_3M'$, $NR_4^{3\oplus}$, Y', $(CH_2CH_2O)_pCH_3$ and mixtures thereof, where Y' can by any halogen, sulfate, sulfonate, or oxygen containing anion, p can be 1 to 500, and M' can be a cationic counterion or hydrogen. In one embodiment, M' (either here or M' above) can be any monovalent metal ion or any ammonium ion including primary, secondary, tertiary, and quaternary amines (e.g., $NR_4^+$, where R can be independently hydrogen or branched or linear, or substituted or unsubstituted alkyl or aryl groups). In another embodiment, Y' can by any halogen, sulfate, or sulfonate.

The monovalent group can be hydrogen, an alkyl group, an aryl group, alkoxy group, or aryloxy group, including linear or branched, or substituted or unsubstituted alkyl, alkoxy, aryl, or aryloxy groups. The divalent linking group can be any group that is capable of attaching the monovalent group to the aromatic rings of the phthalocyanine or naphthalocyanine compound. In one embodiment, the divalent linking group can be selected from the group consisting of O, NH, COO, CONH, CO, $SO_3$, $SO_2NH$, and combinations thereof.

In one embodiment, the near-infrared absorbing compound set forth generally in Formula 1 above can be represented by the following more specific structure, as illustrated in Formula 2:

Formula 2

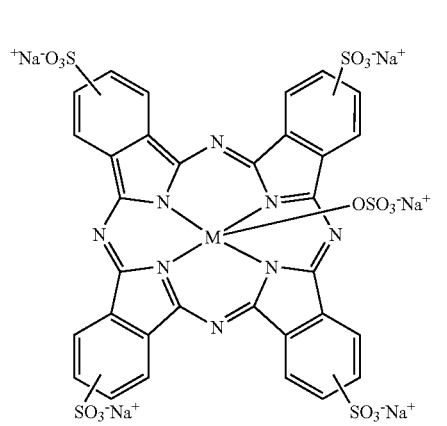

where the water-soluble groups can be attached to the benzene rings of the phthalocyanine compound. Even though the water soluble groups can be attached at various positions on the benzene ring as previously shown, in one embodiment, the water soluble groups can be fixed on a near-infrared compound as illustrated by Formula 3 below:

Formula 3

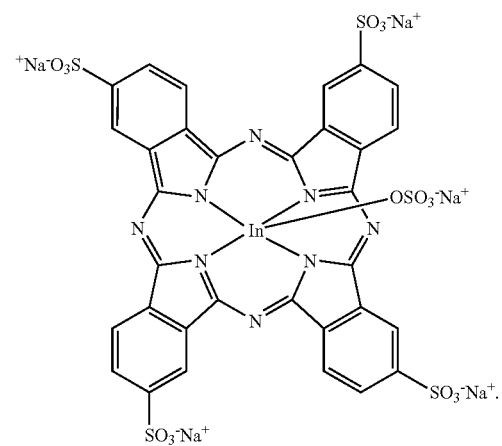

In addition to the phthalocyanine compounds described above, the inks of the present invention can also contain naphthalocyanine compounds. As such, an ink-jet ink can comprise an aqueous vehicle and a near-infrared absorbing compound having the following structure, as illustrated by Formula 4:

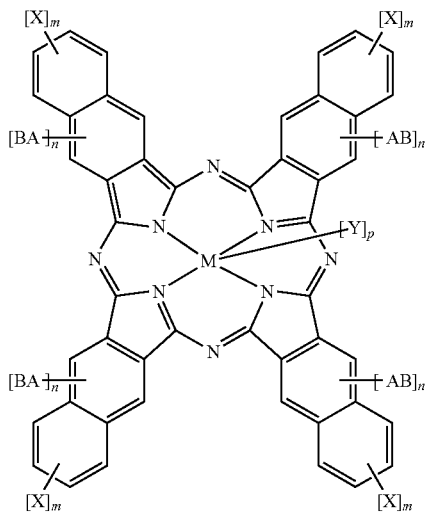

Formula 4

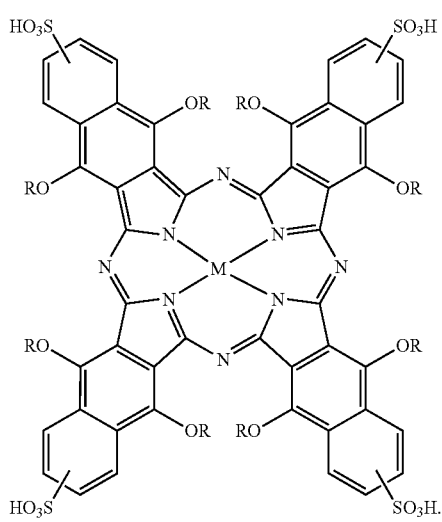

Formula 5 where M is a metal; Y is halogen, OH, $OSO_3M'$, or OCOR where M' is a counterion or hydrogen and R is hydrogen, an alkyl group or an aryl group, including linear or branched alkyl or substituted or unsubstituted alkyl and aryl; p is 0 or 1; X is a water soluble group, m is 0 to 4 with the proviso that the near-infrared absorbing compound has at least one water soluble compound; A is a divalent linking group; B is a monovalent group; and n is 0 to 4. Additionally, the metal, water soluble group, divalent linking group, monovalent group, and M' can be those as previously discussed. In one embodiment, the ink jet ink can further comprise a colorant.

Generally, the metal can be any metal or semi-metal. In one embodiment, the metal can be selected from the group consisting of indium, gallium, thallium, germanium, tin (II and IV), antimony, bismuth, zinc, cobalt, nickel, silicon, titanium, vanadium, chromium, manganese, yttrium, scandium, zirconium, niobium, molybdenum, ruthenium, rhodium, hafnium, tantalum, bismuth, and mixtures thereof. In another embodiment, the metal can be indium. In still another embodiment, the metal can be gallium or thallium.

The water soluble group can be any substituent that is hydrophilic or water soluble. As such, the water soluble group can be selected from the group consisting of COOM', $SO_3M'$, $PO_3M'$, $NR_4^+$, Y', $(CH_2CH_2O)_pCH_3$ and mixtures thereof, where Y' can by any halogen, sulfate, sulfonate, or oxygen containing anion, p can be 1 to 500, and M' can be a cationic counterion or hydrogen. In one embodiment, M' (either here or M' above) can be any monovalent metal ion or any ammonium ion including primary, secondary, tertiary, and quaternary amines (e.g., $NR_4^+$, where R can be independently hydrogen or branched or linear, substituted or unsubstituted alkyl or aryl groups). In another embodiment, Y' can by any halogen, sulfate, or sulfonate.

The monovalent group can be hydrogen, an alkyl group, an aryl group, alkoxy group, or aryloxy group, including linear or branched, or substituted or unsubstituted alkyl, alkoxy, aryl, or aryloxy groups. The divalent linking group can be any group that is capable of attaching the monovalent group to the aromatic rings of the phthalocyanine or naphthalocyanine compound. In one embodiment, the divalent linking group can be selected from the group consisting of O, NH, COO, CONH, CO, $SO_3$, $SO_2NH$, and combinations thereof.

In one embodiment, the near-infrared absorbing compound can be represented by the following structure, as illustrated in Formula 5:

In Formula 5, m can be as described in Formula 4. Specifically, in one embodiment, the metal can be copper, and in another embodiment, the metal can be indium, gallium, or thallium. Additionally, in this embodiment, R can be independently selected from the group consisting of a substituted or unsubstituted, linear or branched alkyl group having 1-10 carbons; a halogen substituted aryl group, an unsubstituted aryl group, combinations thereof, and mixtures thereof.

In addition to the near-infrared absorbing compounds described herein as well as the inks containing such compounds, the present disclosure provides a method of printing such compounds and inks. In one embodiment, a method of printing any of the near-infrared absorbing compounds described herein can comprise printing an ink-jet ink containing the near-infrared absorbing compound with an ink-jet printer.

Generally, ink-jet printers contain ink-jet ink print heads that are used to eject ink droplets accurately at precise locations on print media. As such, ink-jet printers can contain from several nozzles in the print head to more than 400 nozzles. A high population of nozzles can increase the print quality and speed of the ink-jet printing. However, frequently, the nozzles get blocked because of the usage of pigmented inks or inks containing particles, such as binders, resins, latexes, etc. As such, streaks can occur, which leads to poor print quality.

As such, ink-jet printers having near-infrared absorbing compounds in the ink-jet ink can be coupled to a detection system used to monitor nozzle health. Generally, the detection system monitors the ink ejected from the nozzles by detecting the near-infrared absorbing compound in the ink-jet ink. If the detection system fails to detect the near-infrared absorbing compound, the printer can ascertain that such nozzle is blocked or otherwise faulty and adjust the printing by using a different nozzle(s), thereby maintaining print quality and performance.

Additionally, the present ink-jet inks can provide security features. The present near-infrared absorbing compounds can be tailored to absorb specific wavelengths. Once an ink-jet ink has been manufactured with a near-infrared absorbing compound described herein, such an ink can be characterized by determining the absorption of the ink in the near-infrared wavelength region. After such information is determined and catalogued, the ink-jet ink can be printed and subsequently verified for its particular absorption. The ink could then be used to determine the authenticity of the print.

Additionally, the present near-infrared absorbing compounds can provide increased stability by increasing the extinction coefficient of the near-infrared absorbing compounds. As such, the present near-infrared absorbing compounds allow for an ink jet ink formulation having a smaller quantity of the near-infrared absorbing compounds, leading to lower production costs. The stability also provides more flexibility in the pH range of the ink. In one embodiment, the ink jet inks described herein can have a pH from about 0.1 to about 13. In another embodiment, the pH can be from about 2 to about 10.

The inks of the present disclosure can be used with commercially available ink jet printers, such as DESKJET™ or PHOTOSMART™ and other similar printers manufactured by Hewlett-Packard Company. It is notable that these inks are acceptable for use with both thermal ink-jet ink printers and piezo ink jet printers. They can also be used with off-axis printers, which have a high demand with respect to maintaining a reliable ink with low incidences of clogging. Further, these ink sets can produce true colors on a variety of media, including uncoated media, clay coated media, inorganic porous coated media, e.g., silica- and alumina-based media, and organic swellable media, e.g., gelatin coated media, each with improved light fastness, gamut, and other print quality enhancements.

As previously discussed, the inks of the present invention can include a colorant in the form or a dye and/or pigment. In one embodiment, the ink can be a black ink, cyan ink, magenta ink, yellow ink, pale cyan ink, pale magenta ink, green ink, blue ink, orange ink, pink ink, gray ink, etc. Additionally, multiple inks can be used to form an ink set for use with the printers described herein. As such, a printer can have from one to multiple dyes in a single ink, each having more than one dye load, and/or multiple dyes in over an ink set. Some or all of the inks in an ink set can additionally include the near IR dyes described herein, or an ink might include a near IR dye described herein without the presence of another colorant.

A typical liquid vehicle formulation that can be used with a dye set of the present invention can include one or more organic co-solvent(s), present in total at from 5.0% to 50.0% by weight, and one or more non-ionic, cationic, and/or anionic surfactant(s), present from 0.01% to 10.0% by weight. The balance of the formulation can be purified water, or other vehicle components known in the art such as biocides, viscosity modifiers, pH adjusting agents, sequestering agents, preservatives, anti-kogation agents, bleed control agents, drying agents, jettability agents, and the like.

Classes of co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include 2-pyrrolidinone, derivatized 2-pyrrolidinone including 1-(2-hydroxyethyl)-2-pyrrolidinone, 2-methyl-1,3-propanediol, tetraethylene glycol, and ethylhydroxypropanediol (EHPD), to name a few.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. Specific examples of preferred surfactants for use include SOLSPERSE, TERGITOL, DOWFAX, and the like. The amount of surfactant added to the formulation, if included, may range from 0.01% to 10.0% by weight.

Consistent with the formulation of this invention, various other additives may be employed to optimize the properties of the ink composition for specific applications. Examples of these additives are those added to inhibit the growth of harmful microorganisms. These additives may be biocides, fungicides, and other anti-microbial agents, which are routinely used in ink formulations. Examples of suitable microbial agents include, but are not limited to, NUOSEPT, UCARCIDE, VANCIDE, PROXEL, and combinations thereof.

Sequestering agents, such as EDTA (ethylenediaminetetraacetic acid), may be included to eliminate the deleterious effects of metal impurities. Such sequestering agents, if present, typically comprise from 0.01 wt % to 2 wt % of the ink-jet ink compositions. Viscosity modifiers may also be present, as well as other additives known to those skilled in the art to modify properties of the ink as desired. Such additives can be present in the ink-jet ink compositions at from 0 wt % to 20 wt %.

Various buffering agents or pH adjusting agents can also be optionally used in the ink-jet ink compositions of the present invention. Typical pH adjusting agents include such pH control solutions as hydroxides of alkali metals and amines, such as lithium hydroxide, sodium hydroxide, potassium hydroxide; citric acid; amines such as triethanolamine, diethanolamine, and dimethyl-ethanolamine; hydrochloric acid; and other basic or acidic components. If used, pH adjusting agents typically comprise less than about 10 wt % of the ink-jet ink composition. Similarly, buffering agents can be used such as, but not limited to, TRIS, MOPS, citric acid, acetic acid, MES, etc. If used, buffering agents typically comprise less than about 3 wt % of the ink-jet ink composition and generally from about 0.01 wt % to 2 wt %, most commonly from 0.2 wt % to 0.5 wt %. Additionally, anti-kogation agents that can be used include lithium phosphate, sodium phosphate, phosphate esters of fatty alcohol alkoxylates, and the like, in amounts from about 0.01 wt % to 5 wt %.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what are presently deemed to be the most practical and preferred embodiments of the invention.

Example 1

Synthesis of Indium Phthalocyanine Sulfonate Sodium Salt

Indium phthalocyanine chloride (0.3 g) is mixed with 2.7 ml of fuming sulfuric acid (having 20% sulfurtrioxide content). This mixture is stirred at ambient temperature under nitrogen for 4 days. The mixture is then poured in crushed ice. This water solution is washed with cold water to remove excess sulfuric acid. The obtained material is neutralized with 50% sodium carbonate solution to a pH of 7.5. The starting material, indium phthalocyanine chloride, is not soluble in water, whereas the product after sulfonation is readily soluble in water. The product obtained is shown in Formula 6 as the sulfonated indium phthalocyanine with sodium ions as counter ions. This compound exhibited absorption at 750 nm, and upon dissolution in water, is stable over a period of at least a few weeks. Other counter ions can be prepared by replacing sodium carbonate with other carbonates, bicarbonates, or hydroxides. Alternatively organic amines such as triethylamine, triethanolamine, or hydroxyethylamine can also be used to form organic salts.

Formula 6

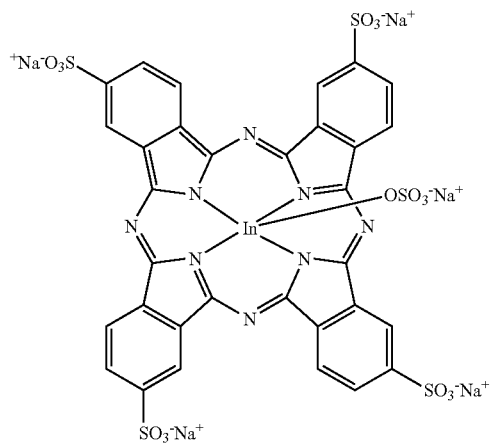

Example 2

Synthesis of Copper Naphthalocyanine Sulfonate Sodium salt

Copper naphthalocyanine (3.1 g) is mixed with 6.8 g of fuming sulfuric acid (having 20% sulfurtrioxide content). This mixture is stirred at ambient temperature under nitrogen for 4 days. This mixture is poured in crushed ice. This water solution is washed with cold water to remove excess sulfuric acid. The material is neutralized with 50% sodium carbonate solution to a pH of 7.5. The starting material, copper naphthalocyanine, is not soluble in water, whereas the product after sulfonation is readily soluble in water. The product is shown in Formula 7 as sulfonated copper naphthalocyanine with sodium ions as counter ions. Other counter ions can be prepared by replacing sodium carbonate with other carbonates, bicarbonates, or hydroxides. Alternatively, organic amines such as triethylamine, triethanolamine, or hydroxyethylamine can be used to form organic salts.

Formula 7

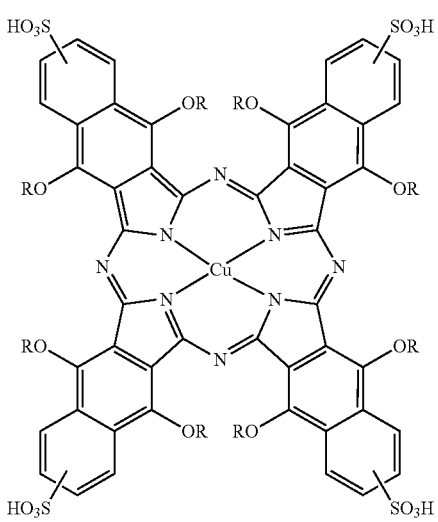

Example 3

Synthesis of Indium Naphthalocyanine Sulfonate Sodium Salt 2,3-Dicyanonaphthalene (0.322 g) is heated with indium chloride (0.1 g) in dimethyl formamide (3 ml) along with ammonium molybdate catalyst (0.015 g) to 195° C. for 2 hours. The reaction mixture is cooled to ambient temperature and washed with isopropanol to remove some soluble impurities. The product is dried to obtain indium naphthalocyanine. This naphthalocyanine is sulfonated similar to Example 1 using 2.5 ml of fuming sulfuric acid (having 20% sulfur trioxide content) to obtain Indium naphthalocyanine sulfonate sodium salt.

Example 4

Synthesis of Silicon Naphthalocyanine Sulfonate Sodium Salt

Silicon naphthalocyanine dioctylide (0.25 g, available from Aldrich) is sulfonated similar to Example 1 using 2 ml of fuming sulfuric acid (having 20% sulfur trioxide content) to obtain silicon naphthalocyanine sulfonate sodium salt.

Example 5

Synthesis of Vanadyl Naphthalocyanine Sulfonate Sodium Salt

Vanadyl naphthalocyanine (1 g, available from Aldrich) is sulfonated similar to Example 1 using 6 ml of fuming sulfuric acid (having 20% sulfur trioxide content) to obtain vanadyl naphthalocyanine sulfonate sodium salt.

Example 6

Synthesis of Gallium Naphthalocyanine Sulfonate Sodium Salt

A mixture of Gallium (III) 2,3-naphthalocyanine chloride (I) in 1.0 mL of fuming sulfuric acid is stirred at room temperature for overnight under nitrogen. The resulting mixture is then quenched with ice-water (30 mL), and then centrifuged and decanted. To the residue of the solid is added 20 mL of water. The mixture is again centrifuged and decanted. The resulting solid is redispersed into 10 mL of water and is basified with saturated sodium carbonate aqueous solution to pH 7. Then, the mixture is further purified with a LH 20 column and eluted with water. The water is then evaporated off in a vacuum, giving rise to 500 mg of the desired gallium naphthalocyanine sulfonate sodium salt (II) as shown in Formula 8. Gallium naphthalocyanine sulfonate sodium salt shows strong absorptions from 700 to 900 nm, with maximum absorptions 737 nm and 797 nm respectively.

Formula 8

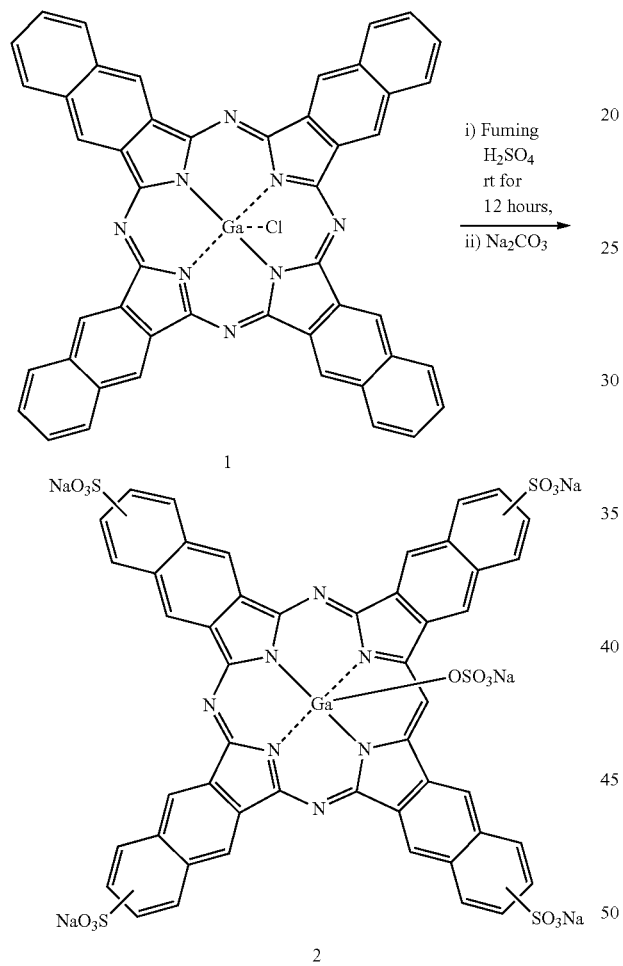

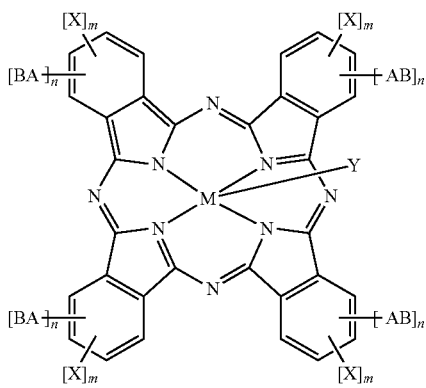

While the invention has been described with reference to certain preferred embodiments, those skilled in the art will appreciate that various modifications, changes, omissions, and substitutions can be made without departing from the spirit of the invention. For example, though specific vehicles are shown for use in Example 1, other vehicles can also be used. It is intended, therefore, that the invention be limited only by the scope of the following claims.

What is claimed is:

1. An ink-jet ink, comprising:
   a) an aqueous vehicle, and
   b) a near-infrared absorbing compound having the following structure:

where M is indium; Y is halogen, OH, $OSO_3M'$, or OCOR where M' is a counterion or hydrogen and R is hydrogen, an alkyl group or an aryl group; X is a water soluble group, m is 0 to 4 with the proviso that the near-infrared absorbing compound has at least one water soluble group; A is a divalent linking group; B is a monovalent group; and n is 0 to 4.

2. The ink-jet ink of claim 1, wherein the alkyl group or the aryl group is linear or branched alkyl, or substituted or unsubstituted alkyl and aryl.

3. The ink jet ink of claim 1, wherein X is selected from the group consisting of COOM', $SO_3M'$, $PO_3M'$, $NR_4^+$, Y', $(CH_2CH_2O)_pCH_3$ and mixtures thereof, Y' is halogen, sulfate, sulfonate, or oxygen containing anion, p is 1 to 500, M' is a monovalent metal ion or $NR_4^+$, and R is independently hydrogen or, branched or linear, substituted or unsubstituted, alkyl or aryl groups.

4. The ink-jet ink of claim 3, wherein X is $SO_3^-Na^+$, m is 1, n is 0, and Y is chloride or $OSO_3^-Na^+$.

5. The ink jet ink of claim 1, wherein A is selected from the group consisting of O, NH, COO, CONH, CO, $SO_3$, $SO_2NH$, and combinations thereof, and wherein B is hydrogen, an alkyl group or an aryl group.

6. The ink-jet ink of claim 1, further comprising a colorant.

7. The ink-jet ink of claim 1, wherein the near-infrared absorbing compound is represented by the following structure:

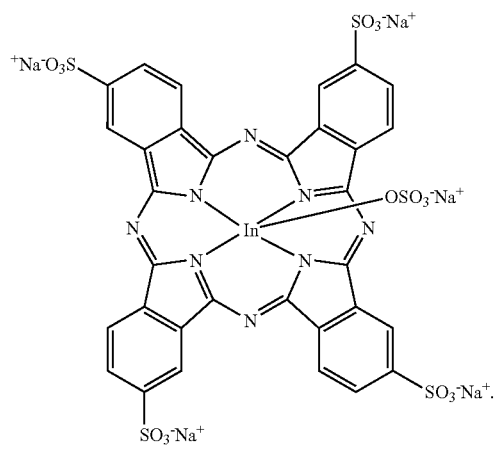

8. A method of printing a near-infrared absorbing compound of claim 1, comprising printing the ink-jet ink with an ink-jet printer.

9. An ink-jet ink, comprising:
a) an aqueous vehicle, and
b) a near-infrared absorbing compound having the following structure:

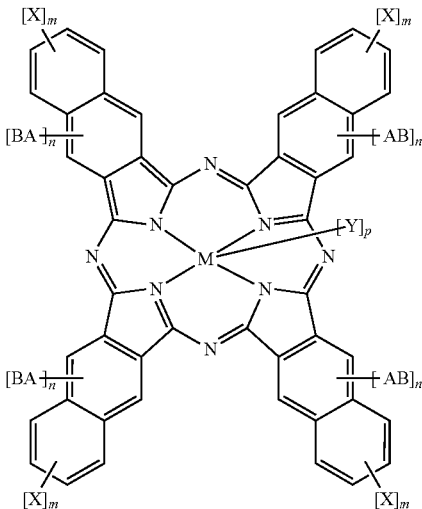

where M is indium; Y is halogen, OH, OSO₃M', or OCOR where M' is a counterion or hydrogen and R is hydrogen, an alkyl group or an aryl group; p is 0 or 1; X is a water soluble group, m is 0 to 4 with the proviso that the near-infrared absorbing compound has at least one water soluble group; A is a divalent linking group; B is a monovalent group; and n is 0 to 4.

10. The ink-jet ink of claim 9, wherein the alkyl group or the aryl group is linear or branched alkyl, or substituted or unsubstituted alkyl and aryl.

11. The ink-jet ink of claim 9, wherein X is selected from the group consisting of COOM', SO₃M', PO₃M', NR₄⁺, Y', (CH₂CH₂O)$_p$CH₃ and mixtures thereof, where Y' is halogen, sulfate, sulfonate, or oxygen containing anion, p is 1 to 500, and M' is a monovalent metal ion or NR₄⁺, where R is independently hydrogen or, branched or linear, substituted or unsubstituted, alkyl or aryl groups.

12. The ink-jet ink of claim 9, wherein X is SO₃⁻Na⁺, m is 1, n is 0, and Y is chloride or OSO₃⁻Na⁺.

13. The ink-jet ink of claim 9, wherein A is selected from the group consisting of O, NH, COO, CONH, CO, SO₃, SO₂NH, and combinations thereof, and wherein B is hydrogen, an alkyl group or an aryl group.

14. The ink-jet ink of claim 9, further comprising a colorant.

15. The ink jet ink of claim 9, wherein the near-infrared absorbing compound is represented by the following structure:

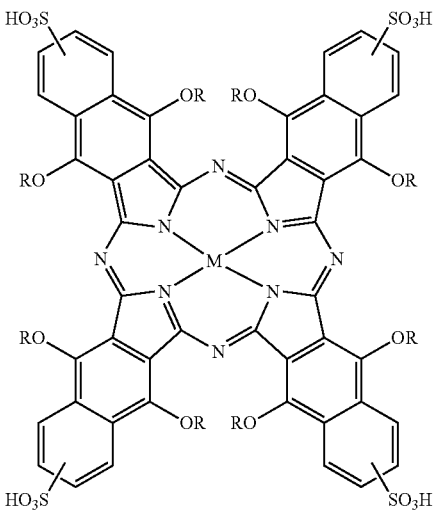

wherein R is selected from the group consisting of a substituted or unsubstituted, linear or branched alkyl group having 1-10 carbons; a halogen substituted aryl group, an unsubstituted aryl group, and combinations thereof.

16. A method of printing a near-infrared absorbing compound of claim 9, comprising printing the ink-jet ink with an ink-jet printer.

* * * * *

UNITED STATES PATENT AND TRADEMARK OFFICE
CERTIFICATE OF CORRECTION

PATENT NO.        : 8,685,154 B2
APPLICATION NO.   : 13/058475
DATED             : April 1, 2014
INVENTOR(S)       : Sivapackia Ganapathiappan et al.

It is certified that error appears in the above-identified patent and that said Letters Patent is hereby corrected as shown below:

In the Specification

In column 11, lines 35-50, delete " 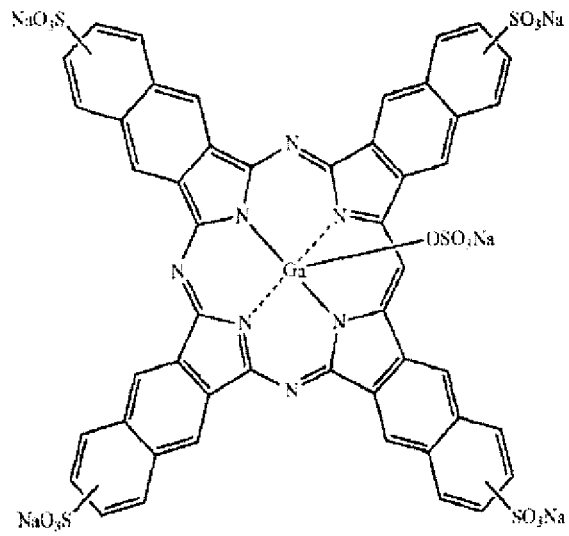 " and

Signed and Sealed this
Twenty-ninth Day of July, 2014

Michelle K. Lee
*Deputy Director of the United States Patent and Trademark Office* insert -- 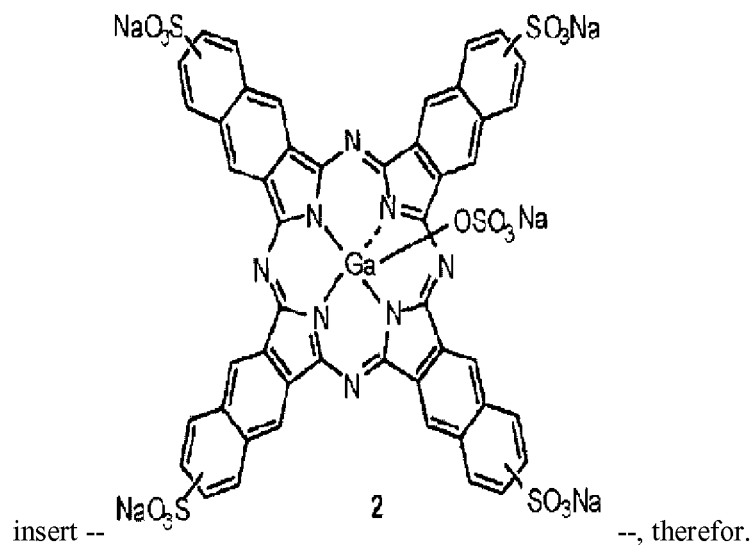 --, therefor.
In the Claims
In column 12, line 28, in Claim 3, delete "ink jet" and insert -- ink-jet --, therefor.
In column 12, line 37, in Claim 5, delete "ink jet" and insert -- ink-jet --, therefor.
In column 14, line 9, in Claim 15, delete "ink jet" and insert -- ink-jet --, therefor.